United States Patent [19]
Irani et al.

[11] 3,832,396
[45] Aug. 27, 1974

[54] ANHYDRIDES OF ORGANO-PHOSPHONIC ACIDS

[75] Inventors: Riyad R. Irani; Robert S. Mitchell, both of St. Louis, Mo.

[73] Assignee: Monsanto Company, St. Louis, Mo.

[22] Filed: May 7, 1969

[21] Appl. No.: 824,378

Related U.S. Application Data
[63] Continuation of Ser. No. 538,198, March 29, 1966, abandoned.

[52] U.S. Cl. ............... 260/545 P, 8/54.2, 8/82, 8/137, 44/72, 71/86, 152/99, 162/158, 252/173, 252/175, 252/545, 252/DIG. 7, 252/11, 252/14, 252/17, 260/429 J, 260/526 N, 260/541, 260/502.5
[51] Int. Cl. ........................ C07f 9/28, C07f 9/38
[58] Field of Search ................ 260/502.5, 545 P

[56] References Cited
UNITED STATES PATENTS

| | | | |
|---|---|---|---|
| 2,599,807 | 6/1952 | Bersworth | 260/502.5 |
| 2,841,611 | 7/1958 | Bersworth | 260/502.5 |
| 2,848,492 | 8/1958 | Saul et al. | 260/545 P |
| 3,288,846 | 11/1966 | Irani et al. | 260/502.5 |

OTHER PUBLICATIONS

Kosolapoff et al., "J. Am. Chem. Soc.," Vol. 73, (1951), pp. 4101 to 4102, QD1A5.

Wagner et al., "Synthetic Organic Chemistry," (1953), pp. 559 to 563, QD262W24.

Grummitt et al., "Organic Synthesis," Vol. 29, (1949), pp. 49 to 52.

Price et al., "J. Am. Chem. Soc.," Vol. 61, (1939), pp. 2760 to 2762, QD1A5.

*Primary Examiner*—Joseph E. Evans
*Attorney, Agent, or Firm*—H. B. Roberts; J. J. Mullen

[57] ABSTRACT

This invention relates to anhydrides of organo-phosphonic acids such as the anhydride of amino tri(-lower alkylidene phosphonic acids) and processes for preparing said anhydrides. An example of the novel anhydrides of the present invention is shown by the following formula (X and Y being hereinafter defined).

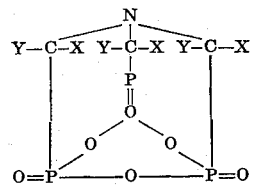

1 Claim, No Drawings

ANHYDRIDES OF ORGANO-PHOSPHONIC ACIDS

This is a streamlined continuation of Ser. No. 538,198 filed Mar. 29, 1966 now abandoned.

This invention relates to anhydrides of organo-phosphonic acids and, more particularly, to anhydrides of organo-amino-phosphonic acids, particularly anhydrides of organo-amino-polyphosphonic acids, and processes for preparing the same.

An object of this invention is to provide new and useful anhydrides of organo-amino-phosphonic acids containing at least one anhydride group per molecule.

Another object of this invention is to provide new and useful anhydrides of organo-amino-polyphosphonic acids containing at least one anhydride group per molecule.

A further object of this invention is to provide a process for preparing anhydrides of organo-amino-phosphonic acids.

Other objects of this invention will be apparent from a reading of the following description.

This invention is directed to new and useful anhydrides of organo-amino-phosphonic acids having the formula:

(I)
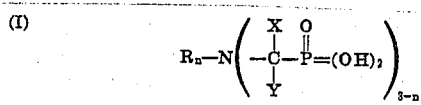

wherein: $n$ is an integer 0 to 2, X and Y are selected from the group consisting of hydrogen and alkyl groups containing from one to six carbon atoms, and R is selected from the group consisting of hydrogen, aliphatic, aryl, alkaryl, aralkyl, alicyclic, and

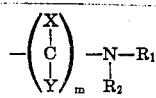

wherein: $m$ is an integer from 1 to 10, and $R_1$ and $R_2$ are each selected from the group consisting of hydrogen, alkyl groups containing from one to six carbon atoms,

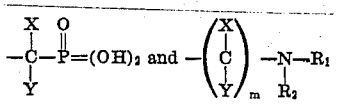

and R does not contain over six nitrogen atoms.

As used herein, the term "anhydride(s) of organo-amino-phosphonic acid(s)" generically describes all of the foregoing. Anhydrides of organo-amino-phosphonic acids can be generally characterized by containing at least one anhydride (P-O-P) group per molecule. Additionally, the preferred phosphonic anhydrides of the present invention are those wherein $n$ of the above phosphonic acids of formula (I) is an integer 0 to 1 and are generically described herein as "anhydride(s) of organo-amino-polyphosphonic acid(s)."

In the foregoing general formula although X and Y are preferably hydrogen when X and Y represent alkyl groups, the groups may be branched or straight chained and when R represents aliphatic groups, the groups may be branched or straight chained as well as being saturated (alkyl) or unsaturated although it is preferred that if the groups are unsaturated they be ethylenically unsaturated and especially preferred are mono-ethylenically unsaturated groups (alkenyl). Additionally, when R represents groups containing alkyl moieties, i.e., aralkyl groups and the like, such carbon chains may be of a straight chain structure or branched chain structure and it is preferred that such contain from one to about 20 carbon atoms. When R represents alicyclic groups such are preferably 5 and 6 membered mono-cyclic alicyclic groups (cyclopentyl and cyclohexyl). When R represents aryl groups or groups containing aryl moieties, i.e., alkaryl groups and the like, such groups are preferably mono-cyclic or di-cyclic groups containing from six to 10 carbon atoms and especially preferred is the mono-cyclic group containing six carbon atoms (phenyl). In addition, the foregoing mentioned hydrocarbyl groups may contain substituent groups, such as, halides (fluoride, chloride, bromide and iodide), alkoxy groups, sulfonyl groups, and the like. Although the hydrocarbyl groups can contain a plurality of such substituent groups, it is preferred that they contain only one such substituent group per hydrocarbyl group. For most end use applications, the compounds of the instant invention should preferably contain not more than about 25 carbon atoms associated with R, $R_1$, $R_2$ and X, and there are few, if any, end uses in which these groups contain more than a total of 50 carbon atoms.

In general, the anhydrides of organo-amino-phosphonic acids can be prepared by the process of reacting an organo-amino-phosphonic acid with a suitable derivative of an organic carboxylic acid. Suitable organic carboxylic acid derivatives include organic carboxylic anhydrides and/or organic carboxylic acid halides. Such organic carboxylic acid derivatives can be characterized by having the following formula:

(II)
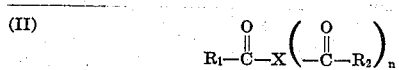

wherein X is a member selected from the group consisting of halogens (preferably chlorine and bromide) and oxygen, $n$ is 0 when X is a halogen and 1 when X is oxygen and $R_1$ and $R_2$ are each a lower aliphatic group containing from one to about six carbon atoms. Although $R_1$ and $R_2$ can represent unsaturated hydrocarbyl groups such as ethylenically unsaturated hydrocarbyl group (alkenyl) and the like, it is preferred that they be an alkyl group.

Suitable organic carboxylic anhydrides include acetic anhydride, perfluoropropionic anhydride, perfluoro-n-butyric anhydride, propionic anhydride, trimethyl acetic anhydride isobutyric anhydride, perfluoro-n-caproic anhydride, dichloroacetic anydride, isovaleric anhydride and the like with acetic anhydride being preferred.

Suitable organic carboxylic acid halides include acetyl chloride, fluoroacetyl chloride, acrylyl chloride, propionyl chloride, isobutyryl chloride, methacrylyl chloride, vinyl acetyl chloride, n-butyryl chloride, diethyl acetyl chloride, iso-valeryl chloride, allyl acetyl chloride, acetyl bromide, propionyl bromide, chloroacetyl bromide, n-butyryl bromide, iso-valeryl bromide, trichloroacetyl bromide, bromoacetyl bromide and the like with acetyl chloride being preferred.

In general, the reaction can be carried out by heating the reactants, that is, an organo-amino-phosphonic acid or mixtures of such acids and an organic carboxylic anhydride or acid halide or mixtures of such anhydrides and/or acid halides, preferably under agitation or stirring, for a time sufficient to prepare the desired products, that is, an anhydride or an organo-amino-phosphonic acid or a mixture of such anhydrides. The reaction for forming an anhydride linkage apparently proceeds with water being split off from two phosphonic acid groups thus forming the desired anhydride linkage (P-O-P) and an organic carboxylic acid, as, for example, according to the following equation using a carboxylic anhydride as a reactant:

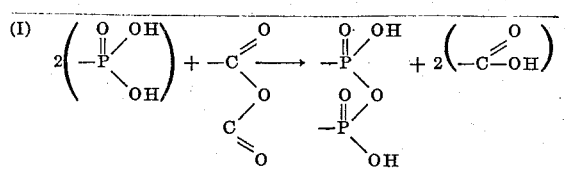

A distinct advantage of the process is the relative insolubility which the organo-amino-polyphosphonic anhydrides of the present invention have in the resulting organic carboxylic acid medium and thus such can be easily recovered from this medium by filtration, centrifuging, decantation and the like.

In general, it is preferred to use the organic carboxylic anhydride in the process of the present invention since such can be used, if desired, without an inert non-aqueous reaction medium. When using an organic carboxylic acid chloride in the process of the present invention, it should preferably be used in an inert non-aqueous reaction medium, especially an organic carboxylic acid, although such mediums containing non-polar solvents can be used which include paraffin hydrocarbons, benzene, toluene, xylene, acetone and the like. When using a non-polar solvent as a reaction medium the phosphonic anhydride product can be recovered therefrom by distilling off the medium or precipitating the phosphonic anhydride product therefrom since, generally speaking, the phosphonic anhydride products exhibit limited solubility in most non-polar solvents.

It should be noted that it is possible to obtain full or complete phosphonic anhydrides from organo-amino-polyphosphonic acids, that is, all phosphonic groups of the molecule participate in phosphonic anhydride linkages, or partial anhydrides wherein the compounds contain phosphonic anhydride linkages as well as phosphonic acid groups. In addition, with some organo-amino-phosphonic acid starting materials, particularly those containing a mono-phosphonic acid group or the poly-phosphonic acids in which a phosphonic group is sterically hindered or is not in close proximity to another phosphonic acid group in the compound, phosphonic anhydride formation, i.e., forming a P-O-P linkage, will occur between organo-amino-phosphonic acid compounds resulting in a degree of dimerization or polymerization.

Elevated temperature conditions are preferred for carrying out the process, such as from about 40°C to the boiling point or melting point of the reactants (under atmospheric pressure, although sub-atmospheric pressures as well as pressures in excess of atmospheric can be used) with temperatures above about 90°C (particularly reflux temperatures) being especially preferred. The reactants can be used in varying amounts depending upon such factors as the degree of anhydride formation desired, particular reactants, temperature conditions and the like. Generally, at least about 0.1 of a mole of organic carboxylic derivative is necessary per mole of organo-amino-phosphonic acid reactant in order to obtain at least some degree of anhydride formation in the phosphonic acid. For complete anhydride formation of organo-amino-polyphosphonic acids, however, it is usually necessary to use at least about 1 mole of organic carboxylic derivative per phosphonic acid group in the organo-amino-polyphosphonic acid. It is preferred in all cases to use excess amounts of the organic carboxylic derivative, that is, amounts above about 1 mole of starting carboxylic derivative per phosphonic acid group in the starting phosphonic acids, and excess amounts of the starting carboxylic derivative of from about 10 to 100 percent are preferred although amounts in excess of 100 percent can be used but such amounts do not, in most cases, appear advantageous.

The organo-amino-phosphonic acids useful as starting materials to prepare the compounds of the instant invention can be prepared by the reaction of a nitrogeneous material (ammonia, primary amines or secondary amines), a compound containing a carbonyl group (aldehyde or ketone) and orthophosphorous acid. Generally, by heating the mixture above about 50°C at a relatively low pH, preferably 2 or below, the extent of the reaction is usually completed in a few hours. Another method is the hydrolysis of the esters of organo-amino-phosphonic acids with concentrated HCl or HBr. Generally, by refluxing the ester and acid at reflux temperature for a period of a few hours is all that is required for the hydrolysis.

Particularly preferred anhydride compounds of the present invention include the amino tri(lower alkylidenephosphonic anhydrides), that is, anhydrides of amino tri(lower alkylidenephosphonic acids) having the formula:

wherein X and Y are selected from the group consisting of hydrogen and alkyl groups containing from one to six carbon atoms.

A complete or full anhydride of an amino tri(lower alkylidenephosphonic acid) of formula (II) above is believed to have the following structure:

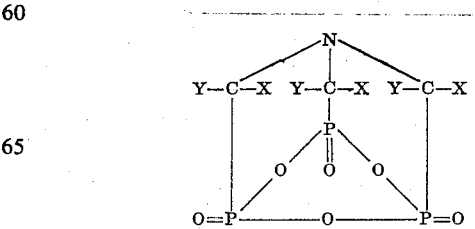

Particularly preferred anhydride compounds of the present invention include the alkyl amino di(lower alkylidenephosphonic anhydrides), that is, anhydrides of alkyl amino di(lower alkylidenephosphonic acids) having the formula:

(III) 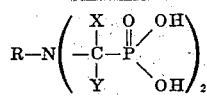

wherein: X and Y are selected from the group consisting of hydrogen and alkyl groups containing from one to six carbon atoms and R is an alkyl group containing from one to 20 carbon atoms.

Particularly preferred anhydride compounds of the present invention include the alkylene diamine tetra(methylene-phosphonic anhydrides), that is, anhydrides of alkylene diamine tetra(methylenephosphonic acids) having the formula:

(IV) 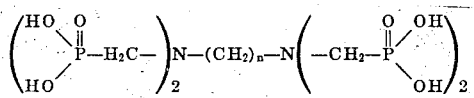

wherein: $n$ is an integer from 1 to 10 inclusive.

The anhydrides of organo-amino-phosphonic acids exhibit several unique and/or distinctive properties which include a distinct increase, usually greater than 5°C and in some cases greater than 50° to 100°C or more, in the melting point (which may in some instances be a decomposition point) for the anhydride of a particular organo-amino-phosphonic acid over the corresponding organo-amino-phosphonic acid as well as a rate of reversion to the corresponding organo-amino-phosphonic acid of greater than 1 gram per hour when 10 grams of an anhydride of an organo-amino-phosphonic acid is slurried in 100 cc. of water for 1 hour at 40°C.

The anhydrides of organo-amino-phosphonic acids exhibit an infra-red absorption spectra characteristic of a phosphonic anhydride (Nujol mull, Beckman model IR-4 spectrophotometer). Such spectra includes the anhydride linkage, P-O-P linkage, as an asymmetric vibration mode at an approximate frequency of 900 to 980 cm$^{-1}$; for anhydrides containing no

groups, a P=O (free) stretching mode at an approximate frequency of 1,250 to 1,350 cm$^{-1}$; and for anhydrides containing

groups, a P=O (hydrogen bonded) stretching mode at approximately 1,150 to 1,250 cm$^{-1}$ which is stronger in intensity than a P-OH deformation mode at approximately 930 to 1,030 cm$^{-1}$ as compared to the intensity of a P=O (hydrogen bonded) stretching mode and P-OH deformation mode of the parent organo-aminophosphonic acid. (Reference: L. T. Bellamy, "The Infra-Red Spectra of Complex Molecules," John Wiley and Sons, Inc., New York, N.Y., Second Ed., 1959)

In general, the anhydrides or organo-aminophosphonic acids of the present invention have utility in practically all fields wherein their amine and/or phosphonic anhydride properties can be utilized as well as fields employing an aqueous medium wherein they, by reversion to their corresponding organo-aminophosphonic acids, have the same utility as such phosphonic acids.

In particular, the compounds of the present invention can find utility in such fields as sequestering or chelating agents, water-treating agents, stabilizers for peroxy compounds, soap anti-oxidants, additives in liquid soap, detergents and shampoos, agents for use in scouring wool cloth and cotton kier boiling, metal cleaning compositions, rubber and plastic compositions and polymerization processes, bottle washing compositions, dairy cleaning compositions, agents for use in pulp and paper processing, corrosion inhibitors, feed and vegetation supplements, herbicides, insecticides, metal treating compositions, electroplating, detergent builders for organic surfactant actives, lime soap dispersants, surfactants, film formers in hair sprays and soluble packages, dispersants for clays, drilling muds, paper pulps, inorganic and organic pigments, and cement slurries, bactericide potentiators, hair modifiers in shampoos, fertilizers, food and beverage acidulants, leavening agents, cheese emulsifiers, modifying agents in evaporated and condensed milk, flame retardants in paints, oil additives, gasoline additives, dentifrice compositions and the like.

The following examples are presented to illustrate the invention, with parts and percentages by weight being used in the examples unless otherwise indicated.

EXAMPLE 1

Into a suitable reaction vessel equipped with an agitator, thermometer and reflux condenser, are charged about 30 parts of amino tri(methylenephosphonic acid) and 61 parts of acetic anhydride. The reaction mixture is stirred so as to achieve a good dispersion of the acid in the acetic anhydride and then heated at reflux temperatures for about 3 hours under stirring. The initial reflux is at about 135°C and gradually drops to about 126°C as the concentration of by-product acetic acid increases. The reaction batch is cooled to room temperature and then filtered, obtaining the product as filter cake. The cake is washed with diethyl ether or acetone and then dried yielding about 24 parts of an anhydride of amino tri(methylene-phosphonic acid), N(CH$_2$)$_3$P$_3$O$_6$, a white crystalline product melting in the range of 350°–400°C (d) as compared to a melting point of 210°–212°C (d) for crystalline amino tri(methylenephosphonic acid).

EXAMPLE 2

Into a suitable reaction vessel such as described in Example 1 above, are charged about 74 parts of dodecyl amino di(methylenephosphonic acid) and about 164 parts of acetic anhydride. The reaction mixture is stirred so as to achieve a good dispersion of the acid in the acetic anhydride and then heated at reflux temperatures (about 125°–135°C) for about 3 hours under stirring. The reaction batch is cooled to room temperature and then filtered, obtaining the product as filter cake. The cake is washed with diethyl ether or acetone and then dried yielding about 64 parts of an anhydride of dodecyl amino di(methylenephosphonic acid), $C_{12}H_{25}N(CH_2)_2P_2O_4$, a crystalline product melting in the range of about 257°C – 269°C (d) as compared to a melting point of 207° – 219°C (d) for dodecyl amino di(methylenephosphonic acid).

EXAMPLE 3

Into a suitable reaction vessel such as described in Example 1 above, are charged about 24 parts of pentamethylene diamine tetra(methylenephosphonic acid), and about 82 parts of acetic anhydride. The reaction mixture is stirred so as to achieve a good dispersion of the acid in the acetic anhydride and then heated at reflux temperatures (about 125°–135°C) for about 3 hours under stirring. The reaction batch is cooled to room temperature and then filtered, obtaining the product as filter cake. The cake is washed with diethyl ether or acetone and then dried yielding about 22 parts of an anhydride or pentamethylene diamine tetra(methylenephosphonic acid), a crystalline product exhibiting a melting point of about 210°C (d) as compared to a melting point of about 150°C (d) for the parent acid, pentamethylene diamine tetra(methylenephosphonic acid). Only about half of the expected weight loss was obtained (as compared to the expected weight loss for complete anhydride formation) indicating only partial anhydride formation.

EXAMPLE 4

Into a suitable vessel such as described in Example 1 above, are charged about 30 parts of amino tri(ethylidenephosphonic acid) and about 80 parts of acetic anhydride. The reaction mixture is stirred so as to achieve a good dispersion of the acid in the acetic anhydride and then heated at temperatures of about 100°–110°C for about 10 hours under stirring. The reaction batch is cooled to room temperature and then filtered, obtaining the product as filter cake. The cake is washed with diethyl ether or acetone and then dried yielding an anhydride of amino tri(ethylidenephosphonic acid).

EXAMPLE 5

Into a suitable vessel such as described in Example 1 above, are charged about 220 parts of methyl amino di(methylene-phosphonic acid) and about 280 parts of propionic anhydride. The reaction mixture is stirred so as to achieve a good dispersion of the acid in the anhydride and then heated at reflux temperatures (140°–155°C) for about 4 hours under stirring. The reaction batch is then cooled to room temperature and then filtered, obtaining the product as filter cake. The cake is washed with diethyl ether or acetone and then dried yielding an anhydride of methyl amino di(methylenephosphonic acid).

EXAMPLE 6

Into a suitable vessel such as described in Example 1 above, are charged about 350 parts of decyl amino di(methylene-phosphonic acid) and about 250 parts of acetic anhydride. The reaction mixture is stirred so as to achieve a good dispersion of the acid in the anhydride and then heated at reflux temperatures (125°–135°C) for about 6 hours under stirring. The reaction batch is cooled to room temperature and then filtered, obtaining the product as filter cake. The cake is washed with diethyl ether or acetone and then dried yielding an anhydride of decyl amino di(methylenephosphonic acid).

EXAMPLE 7

Into a suitable vessel such as described in Example 1 above, are charged about 400 parts of tetradecyl amino di(methylenephosphonic acid) and about 270 parts of acetic anhydride. The reaction mixture is stirred so as to achieve a good dispersion of the acid in the anhydride and then heated at temperatures of about 90°–100°C for about 16 hours under stirring. The reaction batch is cooled to room temperature and then filtered, obtaining the product as filter cake. The cake is washed with diethyl ether or acetone and then dried yielding an anhydride of tetradecyl amino di(methylenephosphonic acid).

EXAMPLE 8

Into a suitable vessel such as described in Example 1 above, are charged about 350 parts of methyl amino di(butylidene-phosphonic acid) and about 270 parts of acetic anhydride. The reaction mixture is stirred so as to achieve a good dispersion of the acid in the anhydride and then heated at reflux temperatures (125°–135°C) for about 6 hours under stirring. The reaction batch is cooled to room temperature and then filtered, obtaining the product as filter cake. The cake is washed with diethyl ether or acetone and then dried yielding an anhydride of methyl amino di(butylidene-phosphonic acid).

EXAMPLE 9

Into a suitable vessel such as described in Example 1 above, are charged about 500 parts of ethylene diamine tetra (methylenephosphonic acid) and about 450 parts of acetic anhydride. The reaction mixture is stirred so as to achieve a good dispersion of the acid in the anhydride and then heated at reflux temperatures (125°–135°C) for about 8 hours under stirring. The reaction batch is cooled to room temperature and then filtered, obtaining the product as filter cake. The cake is washed with diethyl ether or acetone and then dried yielding an anhydride of ethylenediamine tetra(methylenephosphonic acid). From the weight loss of the anhydride only partial anhydride formation is indicated.

EXAMPLE 10

Into a suitable vessel such as described in Example 1, above, are charged about 235 parts of diethyl amino mono (methylenephosphonic acid) and about 240 parts of acetic anhydride. The reaction mixture is stirred so as to achieve a good dispersion of the acid in the anhydride and then heated at reflux temperatures (125°–135°C) for about 6 hours under stirring. The acetic acid and excess acetic anhydride are distilled off leaving a highly viscous product. The product is washed with diethyl ether or acetone and then dried yielding an anhydride of diethyl amino mono(methylenephosphonic acid) which appears to be in a polymeric form.

EXAMPLE 11

Into a suitable vessel such as described in Example 1 above, are charged about 300 parts of phenyl amino di(methylene-phosphonic acid) and about 300 parts of acetic anhydride. The reaction mixture is stirred so as to achieve a good dispersion of the acid in the anhydride and then heated at reflux temperatures (125°–135°C) for about 4 hours under stirring. The reaction batch is cooled to room temperature and then filtered, obtaining the product as filter cake. The cake is washed with diethyl ether or acetone and then dried yielding an anhydride of phenyl amino di(methylenephosphonic acid).

EXAMPLE 12

Into a suitable vessel such as described in Example 1 above, are charged about 600 parts of butyric anhydride and about 300 parts of cyclohexyl amino di(methylenephosphonic acid). The reaction mixture is stirred so as to achieve a good dispersion of the acid in the anhydride and then heated at reflux temperatures (160°–170°C) for about 8 hours under stirring. The reaction batch is cooled to room temperature and then filtered, obtaining the product as filter cake. The cake is washed with diethyl ether or acetone and then dried yielding an anhydride of cyclohexyl amino di(methylenephosphonic acid).

EXAMPLE 13

Into a suitable vessel such as described in Example 1 above, are charged about 100 parts of cyclopentyl amino di (methylenephosphonic acid) and about 250 parts of acetic anhydride. The reaction mixture is stirred so as to achieve a good dispersion of the acid in the anhydride and then heated at reflux temperatures (125°–135°C) for about 6 hours under stirring. The reaction batch is cooled to room temperature and then filtered, obtaining the product as filter cake. The cake is washed with diethyl ether or acetone and then dried yielding an anhydride of cyclopentyl amino di(methylenephosphonic acid).

EXAMPLE 14

Into a suitable vessel such as described in Example 1 above, are charged about 350 parts of naphthyl amino di(methylene-phosphonic acid) and about 400 parts of acetic anhydride. The reaction mixture is stirred so as to achieve a good dispersion of the acid in the anhydride and then heated at reflux temperatures, (125°–135°C) for about 8 hours under stirring. The reaction batch is cooled to room temperature and then filtered, obtaining the product as filter cake. The cake is washed with diethyl ether or acetone and then dried yielding an anhydride of naphthyl amino di(methylenephosphonic acid).

EXAMPLE 15

Into a suitable vessel such as described in Example 1 above, are charged about 500 parts of hexylphenyl amino di (methylenephosphonic acid) and about 420 parts of acetic anhydride. The reaction mixture is stirred so as to achieve a good dispersion of the acid in the anhydride and then heated at reflux temperatures (125°–135°C) for about 10 hours under stirring. The reaction batch is cooled to room temperature and then filtered, obtaining the product as filter cake. The cake is washed with diethyl ether or acetone and then dried yielding an anhydride of hexylphenyl amino di(methylenephosphonic acid).

EXAMPLE 16

Into a suitable vessel such as described in Example 1 above, are charged about 440 parts of dodecylphenyl amino di (methylenephosphonic acid) and about 280 parts of acetic anhydride. The reaction mixture is stirred so as to achieve a good dispersion of the acid in the anhydride and then heated at reflux temperatures (125°–135°C) for about 12 hours under stirring. The reaction batch is cooled to room temperature and then filtered, obtaining the product as filter cake. The cake is washed with diethyl ether or acetone and then dried yielding an anhydride of dodecylphenyl amino di(methylenephosphonic acid).

EXAMPLE 17

Into a suitable vessel such as described in Example 1 above, are charged about 350 parts of phenyloctyl amino di (methylenephosphonic acid) and about 250 parts of acetic anhydride. The reaction mixture is stirred so as to achieve a good dispersion of the acid in the anhydride and then heated at reflux temperatures (125°–135°C) for about 12 hours under stirring. The reaction batch is cooled to room temperature and then filtered, obtaining the product as filter cake. The cake is washed with diethyl ether or acetone and then dried yielding an anhydride of phenyloctyl amino di(methylenephosphonic acid).

EXAMPLE 18

Into a suitable vessel such as described in Example 1 above, are charged about 400 parts of phenyltetradecyl amino di (methylenephosphonic acid) and about 280 parts of acetic anhydride. The reaction mixture is stirred so as to achieve a good dispersion of the acid in the anhydride and then heated at reflux temperatures (125°–135°C) for about 10 hours under stirring. The reaction batch is cooled to room temperature and then filtered obtaining the product as filter cake. The cake is washed with diethyl ether or acetone and then dried yielding an anhydride of phenyltetradecyl amino di(methylenephosphonic acid).

EXAMPLE 19

Into a suitable vessel such as described in Example 1 above, are charged about 300 parts of phenylethyl amino di (methylenephosphonic acid) and about 280 parts of acetic anhydride. The reaction mixture is stirred so as to achieve a good dispersion of the acid in the anhydride and then heated at reflux temperatures (125°–135°C) for about 6 hours under stirring. The reaction batch is cooled to room temperature and then filtered, obtaining the product as filter cake. The cake is washed with diethyl ether or acetone and then dried yielding an anhydride of phenylethyl amino di(methylenephosphonic acid).

EXAMPLE 20

Into a suitable vessel such as described in Example 1 above, are charged about 400 parts of chloroacetic anhydride and about 400 parts of oleyl amino di(methylenephosphonic acid). The reaction mixture is stirred so as to achieve a good dispersion of the acid in the anhydride and then heated at temperatures of about 150°–160°C for about 10 hours under stirring. The reaction batch is cooled to room temperature and then filtered, obtaining the product as filter cake. The cake is washed with diethyl ether or acetone and then dried yielding an anhydride of oleyl amino di(methylenephosphonic acid).

EXAMPLE 21

Into a suitable reaction vessel such as described in Example 1 above, are charged about 10 parts of methyl dodecyl amino mono(methylenephosphonic acid) and about 100 parts of acetic anhydride. The reaction mixture is stirred so as to achieve a good solution of the acid in the anhydride and heated at reflux temperatures (125°–135°C) for about 6 hours under stirring. The unreacted acetic anhydride and acetic acid are distilled off from the reaction batch yielding a highly viscous, glassy polymeric anhydride of methyl dodecyl amino mono(methylenephosphonic acid).

EXAMPLE 22

Into a suitable reaction vessel such as described in Example 1 above, are charged about 50 parts of phenyl amino mono(methylenephosphonic acid) and about 100 parts of acetic anhydride. The reaction mixture is stirred so as to achieve a good solution of the acid in the anhydride and heated at reflux temperatures (125°–135°C) for about 6 hours under stirring. The unreacted acetic anhydride and acetic acid are distilled off from the reaction batch yielding a highly viscous, glassy polymeric anhydride of phenyl amino mono(methylenephosphonic acid).

EXAMPLE 23

Into a suitable reaction vessel such as described in Example 1 above, are charged about 300 parts of dodecyl phenyl amino mono(methylenephosphonic acid) and about 260 parts of acetic anhydride. The reaction mixture is stirred so as to achieve a good solution of the acid in the anhydride and heated at relfux temperatures (125°–135°C) for about 8 hours under stirring. The unreacted acetic anhydride and acetic acid are distilled off from the reaction batch yielding a highly viscous, glassy polymeric anhydride of dodecylphenyl ethyl amino mono(methylenephosphonic acid).

EXAMPLE 24

Into a suitable reaction vessel such as described in Example 1 above, are charged about 150 parts of phenyl-ethyl hexyl amino mono(methylenephosphonic acid) and about 180 parts of acetic anhydride. The reaction mixture is stirred so as to achieve a good solution of the acid in the anhydride and heated at reflux temperatures (125°–135°C) for about 8 hours under stirring. The unreacted acetic anhydride and acetic acid are distilled off from the reaction batch yielding a highly viscous, glassy polymeric anhydride of phenyl-ethyl hexyl amino mono(methylenephosphonic acid).

EXAMPLE 25

Into a suitable reaction vessel such as described in Example 1 above, are charged about 200 parts of cyclohexyl amino mono(methylenephosphonic acid) and about 200 parts of acetic anhydride. The reaction mixture is stirred so as to achieve a good solution of the acid in the anhydride and heated at reflux temperatures (125°–135°C) for about 6 hours under stirring. The unreacted acetic anhydride and acetic acid are distilled off from the reaction batch yielding a highly viscous glassy polymeric anhydride of cyclohexyl amino mono (methylenephosphonic acid).

EXAMPLE 26

Into a suitable reaction vessel such as described in Example 1 above, are charged a mixture of about 30 parts of amino tri(methylenephosphonic acid) and about 75 parts of dodecyl amino di(methylenephosphonic acid). About 130 parts of acetic anhydride are charged to the vessel. The reaction mixture is stirred so as to achieve a good dispersion of the phosphonic acids in the anhydride and then heated at reflux temperatures (125°–135°C) for about 12 hours under stirring.

The reaction batch is cooled to room temperature and then filtered, obtaining the product as a filter cake. The cake is washed with acetone and then dried yielding a mixture of an anhydride of amino tri(methylenephosphonic acid), an anhydride of dodecyl amino di(methylenephosphonic acid) and a polymeric anhydride of amino tri(methylenephosphonic acid) and dodecyl amino di(methylenephosphonic acid).

EXAMPLE 27

Into a suitable vessel such as described in Example 1 above, are charged about 25 parts of amino tri(methylenephos-phonic acid) and about 50 parts of acetic acid. The reaction mixture is stirred so as to achieve a good dispersion of the phosphonic acid in the acetic acid and then heated to reflux (125°–135°C) under stirring. While refluxing about 50 parts of acetyl chloride are added sub-surface to the reaction batch at a rate such that the addition takes about 1 to 2 hours. Refluxing is continued for about 1 hour and then the reaction batch is cooled to room temperature. The reaction batch is filtered obtaining about 20 parts of the product as filter cake. The cake is washed with acetone and then dried yielding an anhydride of amino tri(methylenephosphonic acid).

Other organo-amino-phosphonic acids which can be reacted with an organo carboxylic acid derivative according to procedures as illustrated by the foregoing disclosure and examples include:

Aliphatic hydrocarbyl amino mono(methylenephosphonic acids), such as, dipropyl-, hexyl methyl-, dipropenyl-, oleyl ethyl-, didodecyl-, hexadecyl hexyl-, octenyl propyl-, didecyl amino mono(methylenephosphonic acid) and the like; alkaryl amino mono(methylenephosphonic acid), such as, propyl phenyl ethyl-, butyl phenyl-, decylphenyl butyl-, xylyl-, xylyl ethyl-, hexadecylphenyl methyl-amino mono(methylenephosphonic acid) and the like; aralkyl amino mono(methylenephosphonic acid), such as, benzyl-, benzyl methyl-, benzyl hexyl-, phenyl propyl ethyl-, phenylhexyl-, phenylhexadecyl ethyl-, phenyldecyl hexyl-amino mono(methylenephosphonic acid) and the like; aliphatic hydrocarbyl amino di(methylenephosphonic acids), such as, propyl-, butyl-, propenyl, octenyl-, tetradecyl-, nonyl-, hexadecyl-, heptyl-amino di(methylenephosphonic acid), and the like; alkaryl amino di(methylenephosphonic acids), such as propylphenyl-, butylphenyl-, decylphenyl-, xylyl-, oxtadecylphenyl-, octylphenyl-, hexadecylphenyl-, heptylphenyl amino di(methylenephosphonic acid) and the like; aralkyl amino di(methylenephosphonic acids), such as, benzyl- , phenylpropyl-, phenylbutyl-, phenylhexyl-, phenyldecyl-, phenylhexadecyl-amino di(methylenephosphonic acid) and the like; and alkylene polyamine poly(methylenephosphonic acids), such as, trimethylene diamine tetra(methylenephosphonic acid), hexamethylene diamine tetra(methylenephosphonic acid), heptamethylene diamine tetra (methylenephosphonic acid), decamethylene diamine tetra(methylenephosphonic acid), ethylene diamine tri(methylenephosphonic acid), ethylene triamine penta(methylenephosphonic acid), propylene diamine tetra(methylenephosphonic acid) triethylene tetraamine hexa(methylenephosphonic acid), triethylene tetraamine, N-butyl, N',N''-tetra(methylenephosphonic acid), ethylene triamine, N-ethyl, N',N''-tetra(methylenephosphonic acid), hexamethylene diamine, N-diethyl, N'-di(methylenephosphonic acid), ethylene diamine, N-hexyl, N'-di(methylenephosphonic acid), pentaethylene hexaamine, octa(methylenephosphonic acid), pentaethylene hexaamine, tetra(methylenephosphonic acid), decamethylene diamine, N-hexyl, N-ethyl, N'-di(methylenephosphonic acid) and the like.

What is claimed is:

1. An anhydride of amino tri(methylene phosphonic acid) having the formula $N(CH_2)_3P_3O_6$.

* * * * *

UNITED STATES PATENT OFFICE
CERTIFICATE OF CORRECTION

PO-1050 (5/69)

Patent No. 3,832,396     Dated August 27, 1974

Inventor(s) Riyad R. Irani and Robert S. Mitchell

It is certified that error appears in the above-identified patent and that said Letters Patent are hereby corrected as shown below:

Cover Sheet - In the Abstract, Formula should read as follows:

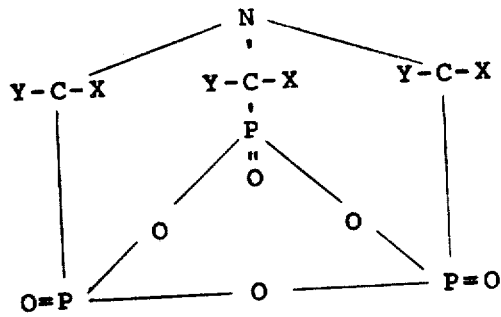

Signed and sealed this 28th day of January 1975.

(SEAL)
Attest:

cCOY M. GIBSON JR.
ttesting Officer

C. MARSHALL DANN
Commissioner of Patents